(12) United States Patent
Northcutt (10) Patent No.: US 6,424,322 B1
(45) Date of Patent: Jul. 23, 2002

(54) MULTI-MODULE STEREOSCOPIC 3D VIDEO VIEWING/LISTENING STATION

(76) Inventor: Jesse D. Northcutt, 1687 Donelwal Dr., Lexington, KY (US) 40511

( * ) Notice: Subject to any disclaimer, the term of this patent is extended or adjusted under 35 U.S.C. 154(b) by 0 days.

(21) Appl. No.: 09/412,824

(22) Filed: Oct. 5, 1999

Related U.S. Application Data (60) Provisional application No. 60/103,066, filed on Oct. 5, 1998.

(51) Int. Cl.[7] .................................................. G09G 5/00
(52) U.S. Cl. ............................ 345/8; 359/630; 348/115
(58) Field of Search ........................... 345/1.1, 1.2, 1.3, 345/157, 156, 7, 8; 361/679–683; D14/114; 348/115; 359/630, 632

(56) References Cited

U.S. PATENT DOCUMENTS

| | | | | |
|---|---|---|---|---|
| 4,247,010 A | * | 1/1981 | Eckert | 211/131.1 |
| 4,695,903 A | * | 9/1987 | Serap et al. | 358/335 |
| 4,976,359 A | * | 12/1990 | Hardy | 211/58 |
| 5,537,127 A | * | 7/1996 | Jingu | 345/1.1 |
| 6,057,810 A | * | 5/2000 | Roell et al. | 345/8 |
| 6,143,181 A | * | 11/2000 | Falkvall et al. | 210/646 |
| 6,152,739 A | * | 11/2000 | Amery et al. | 434/38 |

* cited by examiner

*Primary Examiner*—Bipin Shalwala
*Assistant Examiner*—Mansour M. Said
(74) *Attorney, Agent, or Firm*—J. E. McTaggart (57) ABSTRACT

A transportable multi-unit station for viewing 3D stereoscopic video with accompanying stereo sound, without any necessity of wearing equipment of any kind on the viewer's head, is implemented by a polar array of six identical modules arranged around a central support column mounted onto a large circular baseplate. Each module includes a partially enclosed a hood and is fitted with a pair of stereoscopic eyepieces, for example LCD type, and a pair of optimally located stereo loudspeakers. The stations are constrained individually to the column by rollers that allow only vertical movement. Each station is counter-balanced by a suspension cable, pulley and weight and is supported in place vertically by a unilateral brake mechanism arranged such that a user can easily shift the station upwardly at any time, for which a pair of handles is provided, and can also shift it downwardly by actuating a hand-operated brake release lever provided on at least one of the handles. In this manner the user can easily adjust the elevation of the station so as to position the eyepieces at his or her own best viewing level, and then upon releasing the lever, the unilateral brake automatically supports the station at the optimum viewing elevation for the individual user.

27 Claims, 6 Drawing Sheets

MULTI-MODULE STEREOSCOPIC 3D VIDEO VIEWING/LISTENING STATION

Benefit is claimed under 35 U.S.C. § 119(e) of provisional application No. 60/103,066 filed Oct. 5, 1998 abandoned.

FIELD OF THE INVENTION

The present invention relates to the field of public information and entertainment facilities and more particularly it relates to a transportable public walk-up viewing/listening station that provides a plurality of partially enclosed hooded modules in which a child or adult can comfortably stand and view video programs with accompanying sound, sourced from educational and/or promotional audio-visual media material and preferably in stereoscopic video and stereophonic sound.

BACKGROUND OF THE INVENTION

Public interest in viewing moving images has continued strong over the many decades dating back to the beginning of the "movies". There has been a further fascination with three-dimensional viewing dating back even further to early optical stereoscopic home viewers providing three dimensional still images and public viewing devices such as the "nickelodeon".

Modern audio/video technology has now opened up new possibilities for high quality color video and audio in public viewing facilities for gatherings such as trade shows. Video screen type displays are popular in this field, however they suffer from at least two major disadvantages: (1) high ambient lighting from an uncontrollable environment can severely degrade the visual impact by washing out the picture even with maximum available brightness and contrast levels, and (2) at present, practical systems for stereo or 3D viewing on a screen type display involve some sort of compromise in picture quality, e.g. sharpness or color, in providing the necessary left/right picture information, and typically require each user to wear special polarized or bi-colored "3D" glasses to separate the left and right images. This requirement for "3D" glasses is a great annoyance to users and a potential liability to proprietors of public viewing facilities who are forced to choose between the problem of theft-prevention if the glasses are of good quality versus the ongoing replacement expense and sacrifice of picture quality if the glasses are made as cheap throw-away items. Even with glasses of high quality, whether using color-difference or polarization, the left/right separation, i.e. stereoscopic rejection, tends to be marginal, such that unwanted cross-leakage can degrade the picture with "ghosting" effects.

Recent advances in electro-optics, e.g. LCD and other panel display devices, have made available binocular eyepiece video viewing devices that can provide excellent picture quality. Furthermore such binocular video viewers are inherently adaptable to stereoscopic viewing for a dramatic new 3D impact; stereo-video/stereo-audio source material is becoming increasingly available commercially, particularly in a flicker-free field-sequential format that can be made to include line-doubling, applicable to videotape, CDs, computer memory, etc., for which video cameras and viewing equipment are now becoming commercially available at reduced cost, enabling production of full stereoscopic/stereophonic media even by small independent video studios.

In considering various approaches for the human-interface in the end use of video/audio technology, one possible approach would be to incorporate headphones in a helmet along with the binocular eyepieces as viewing goggles. However for purposes of the present invention it has been concluded that for best enjoyment the eyepieces should be firmly mounted on a stationary structure, and that loudspeakers should be utilized, thus the user is kept free from the constraint of headphones, goggles and/or a helmet.

When binocular eyepiece viewers are mounted to a fixed object such as a walk-up facility for viewing from a standing position, there is an unfulfilled need for an apparatus that would allow the user to conveniently adjust the elevation of the eyepieces so as to optimally match the individual user's height.

DISCUSSION OF RELATED KNOWN ART

U.S. Pat. No. 4,853,764 for a METHOD AND APPARATUS FOR SCREENLESS PANORAMIC STEREO TV requires the user to wear a helmet-like apparatus with built-in stereo headphones and goggle-like enclosures containing eyepiece viewing devices.

U.S. Pat. No. 5,390,246 for a PORTABLE MULTIMEDIA MARKETING SYSTEM discloses a portable presentation case that holds audio and video playback components including a pair of loudspeakers and a video monitor to be hand held by the viewer.

U.S. Pat. No. 4,174,836 for a GAME FOR SIMULATING SUBMARINE CONNING STATION discloses an amusement game which includes a rotating column and viewport for simulating the periscope column at the conning station of a submarine. The display is a video tube.

U.S. Pat. No. 4,695,903 discloses an AUDIO VIDEO ENTERTAINMENT MODULE including an enclosed module which contains a video screen, audio speakers and seating for one or two viewers.

OBJECTS OF THE INVENTION

It is a primary object of the present invention to provide a transportable walk-up entertainment/educational station equipped with a quantity of partially-enclosed individual walk-up viewing/listening modules constituting a form of theater in which attendees of a public gathering can simultaneously but individually enjoy viewing video material along with associated sound.

It is a further object to make the video presentation stereoscopic, i.e. perceived as three-dimensional, and to make the sound stereophonic.

It is a further object that such stations be made attractive and ergonomic: easy, comfortable and satisfying for users of various sizes and ages to view and listen from a standing position.

It is a further object that the multimedia station provide in each module a pair of installed eyepieces adapted for stereoscopic video viewing and a pair of installed stereophonic loudspeakers driven from a related audio source.

It is a further object that the installed pair of eyepieces be attached securely within the corresponding module and that the module be captivated to the station yet easy to adjust for elevation by a user so as to accommodate the particular height of an individual user.

It is a still further object that elevation adjustment of the viewing assembly be made to be easily adjustable manually by the user and that such adjustment should not require any other source of motivating power.

It is a still further object to provide a user control mechanism which includes a default braking action that actuates automatically to prevent any downward movement of the viewing assembly, but which allows the viewing assembly to be raised or lowered readily by the user for individual elevation adjustment.

SUMMARY OF THE INVENTION

The abovementioned objects have been accomplished by the present invention of a transportable walk-up station, to be known commercially as the Fascination Station, that accommodates up to six users simultaneously in six separate partially enclosed modules, each equipped with eyepieces for stereoscopic viewing and with a pair of speakers for stereophonic listening. The modules are arrayed around a central vertical support column to which each module is captivated by a roller assembly that allows vertical travel of each module, counterbalanced so that the user can easily shift the module up or down manually to adjust the eyepieces as required to suit the individual user's height. A unilateral brake mechanism holds the module in place at a constant elevation for viewing, allows the module to be shifted upwardly with only a light upward force, and allows it to be shifted downwardly upon actuation of a hand-operated brake release lever.

BRIEF DESCRIPTION OF THE DRAWINGS

The above and further objects, features and advantages of the present invention will be more fully understood from the following description taken with the accompanying drawings in which.

DETAILED DESCRIPTION

Figure 1:
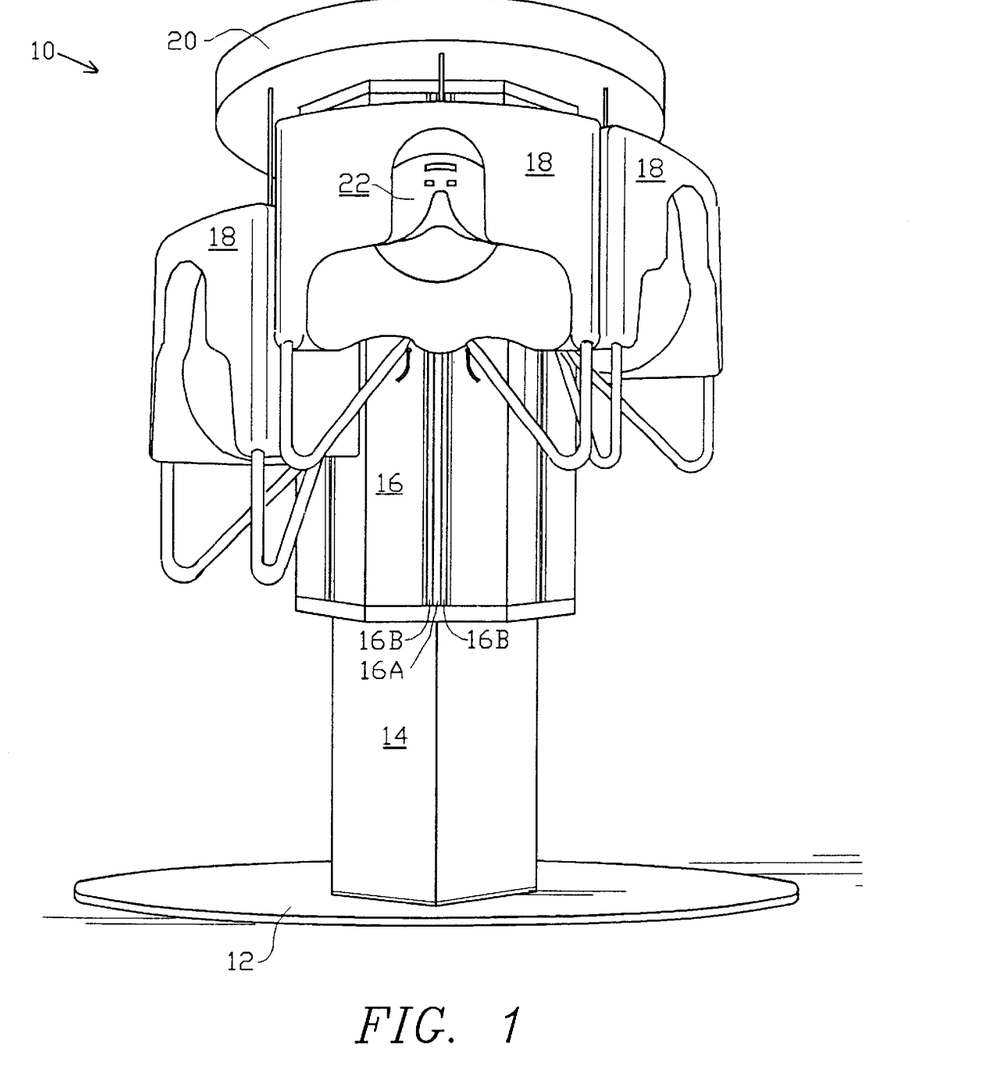
FIG. 1 is a perspective view of a six-module station illustrating a preferred embodiment of the present invention, showing one of the modules lowered for a short viewer.

FIG. 1 is a perspective view of a multi-module viewing/listening station 10 illustrating a preferred embodiment of the present invention, Station 10 is supported on the ground or floor by a large circular baseplate 12, from which a central column extends upwardly and includes a hex-shaped pedestal portion 14, a larger hex-shaped tower portion 16 supporting six viewing/listening modules 18 in a surrounding array, and a circular crown portion 20 on top of tower portion 16.

Each module 18 includes a partial enclosure hood with a front opening having a head-and-shoulders contour and is fitted internally with a pair of stereo loudspeakers (not visible in this view) and a shroud 22 that carries behind it a stereoscopic viewing unit including a pair of eyepieces.

Each module 18 is attached to the central column by a guidance mechanism that makes it free to travel up and down the vertical axis of the central column assembly, while constraining it in all other directions. Each module 18 is individually counter-weighted so that a user can easily move it up or down to adjust the eyepieces to the optimum elevation to the individual user's requirement for comfortable viewing from a standing position.

A vertical slot 16A is located centrally in each hex facet of the tower portion 16, flanked by a pair of aluminum angle strips 16B so as to provide a pair of metal surfaces lining the two sides of the slot 16A that act to guide and constrain the vertical travel of modules 18 and provide a passageway for signal cables suspended in a flexible manner within tower portion 16 and running to each module 18 from an audio/video program source unit which may be located within pedestal portion 14.

Figure 2:
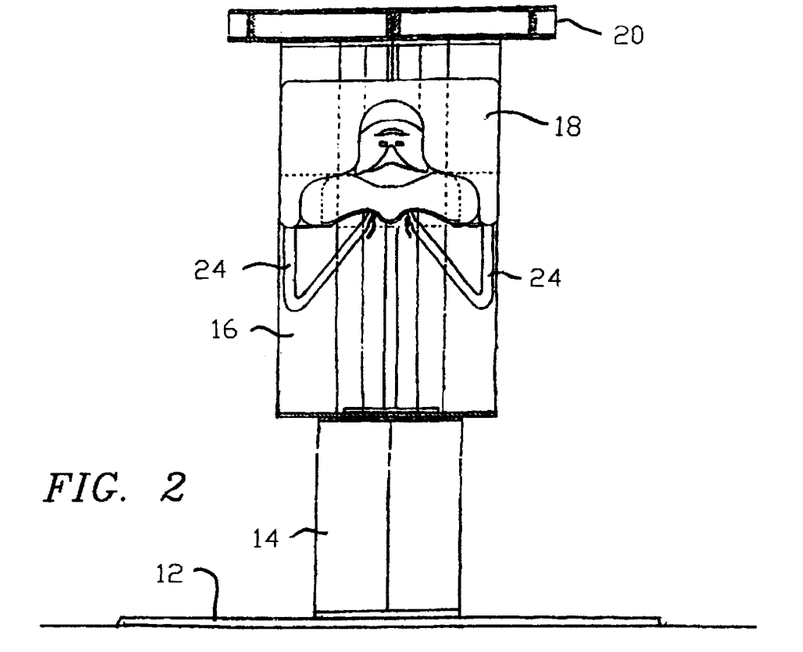
FIG. 2 is an elevational view of the station as in FIG. 1, showing only one of the modules in place.

FIG. 2 is a front elevational view of the station 10 of FIG. 1, showing only a single module 18 in place on tower portion 16 supported by pedestal 14 on base 12. A pair of handles 24 are provided for adjusting the elevation of module 18; the sloping portion of handles 24 may also serve as forearm rests.

Figure 3:
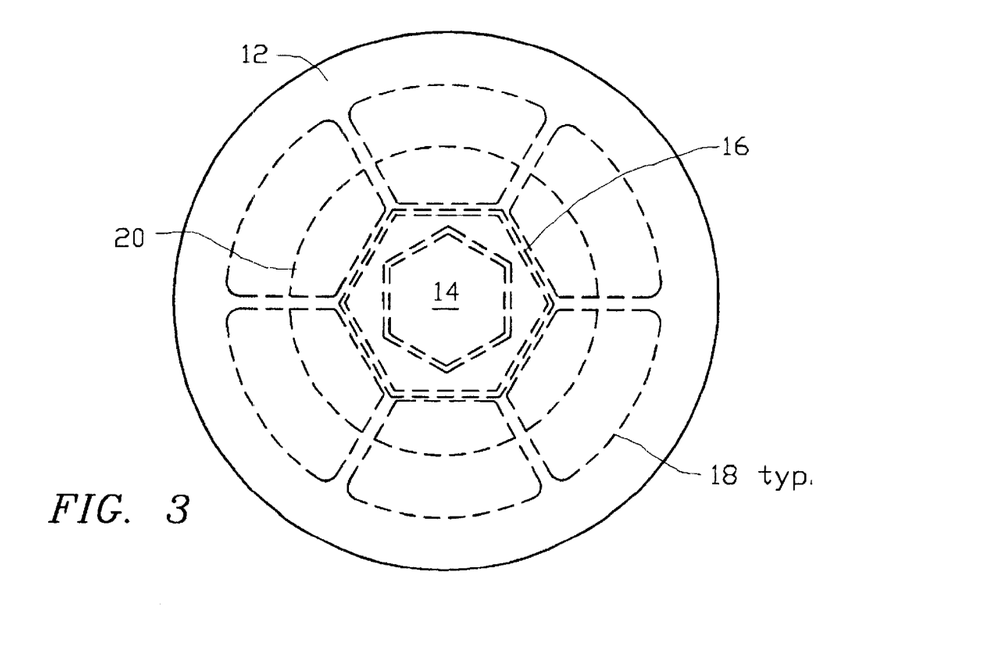
FIG. 3 is a bottom view of the six-module station of FIG. 1.

FIG. 3 is a bottom view of the station 10 of FIG. 1 showing the concentric arrangement of the base plate 12, hex-shaped pedestal 14, larger hex-shaped tower portion 16, six modules 18 and the circular outline of the crown portion 20.

Figure 4:
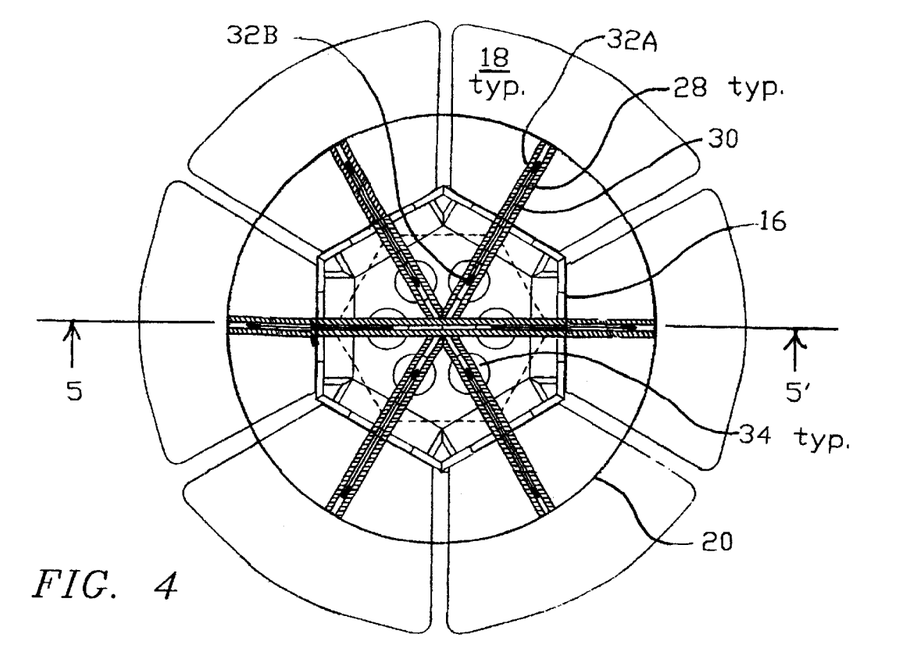
FIG. 4 is a top view of the six-module station of FIG. 1.

FIG. 4 is a top view of the station of FIG. 1 showing the six modules 18, each interfacing a hex facet of the tower portion 16. Guidance suspension channels 28, spanning the diameter of the crown portion 20, contain flex cables 30 and pulleys 32A and 32B of the module counterweight system. Six counterweights 34 are seen contained within the tower portion 16.

Figure 5:
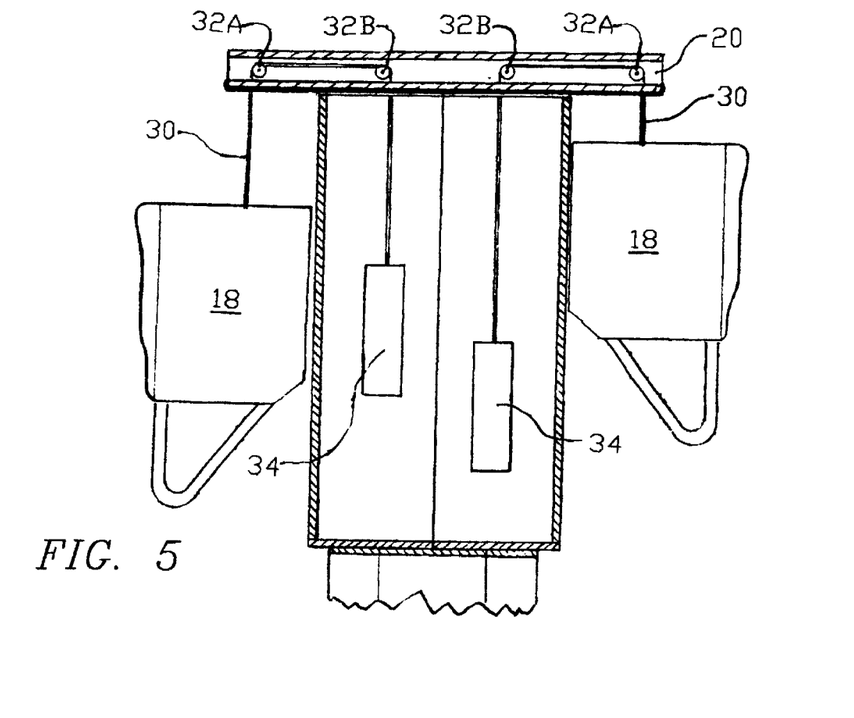
FIG. 5 is a cross-section taken through axis 5–5' of FIG. 4, showing an opposite pair of modules, along with their respective counterbalanced weights, set at different levels as in FIG, 1.

FIG. 5 is a cross-section of the tower portion 16 and crown portion 20 taken through axis 5–5' of FIG. 4, showing an opposite pair of modules 18 along with their respective counterweights 34, each attached via flex cable 30 to the top of the respective module 18, passing over two pulleys 32A and 32B located within the guidance suspension channels 28 (refer to FIG. 4). As in FIG. 1 the left hand module 18 is shown adjusted to a lower elevation, thus its counterweight 34 is seen to be displaced upwardly.

In a particular embodiment the modules 18 weigh about 50 lbs; generally the counterweights 34 are made to approximately equal the weight of the modules to make them easy to raise and lower. The suspension system friction for each module is about 5 lbs: this friction acts to prevent any upward creep even if there is a slight weight imbalance.

Figure 6:
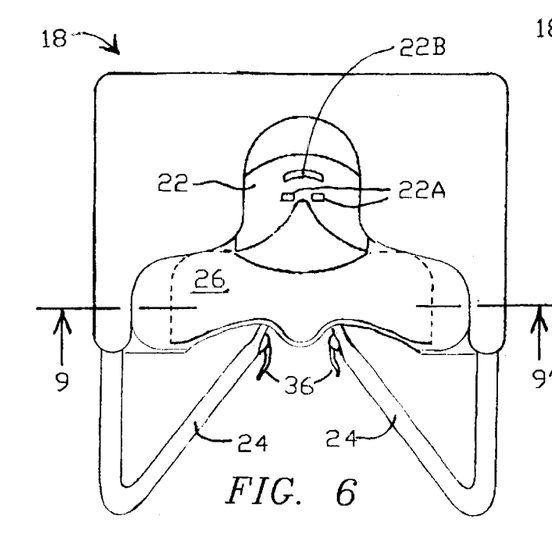
FIG. 6 is a front elevational view of a typical module of the viewing station of FIG. 1.

FIG. 6 is an enlarged front elevational view of a typical module 18 of the viewing station 10 of FIG. 1. Handles 24 are each seen to be equipped with a brake release lever 36, similar to a bicycle hand brake lever, mounted on the rear portion of the handles 24; these, when grasped by the user, act to release a normally-engaged braking mechanism, so that the module 18 can be adjusted for viewing elevation. Shroud 22 is configured with a pair of viewing windows 22A, one for each eye, that correspond to the two eyepieces of a stereoscopic binocular unit which is attached on the rear side of shroud 22, that includes a padded forehead guidepiece that extends through shroud 22 via the opening 22B seen above the viewing windows 22A. Below shroud 22 is a liner panel 26.

Figure 7:
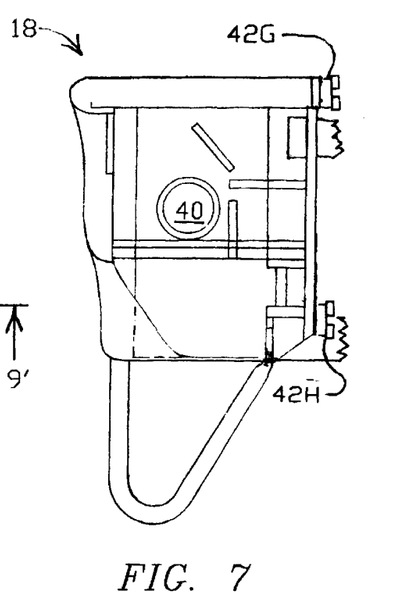
FIG. 7 is a side cutaway view of the module of FIG. 6.

FIG. 7 is a cutaway side elevational view of the module 18 of FIG. 6 with the enclosure cut away (and shroud 22 and liner panel 26 of FIG. 6 removed) to show the interior structure and the location of one of the stereo speakers 40, and showing at the rear a pair of stabilizing roller units 42G and 42H, each having two small rollers.

Figure 8:
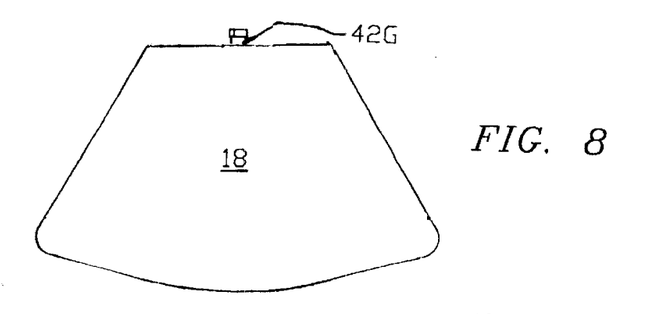
FIG. 8 is a top view of the module of FIG. 6.

FIG. 8 is a top view of the module of FIG. 6 showing its sector-shaped profile with a flat back that interfaces a flat facet of the hex-shaped tower (16: refer to FIG. 4); stabilizing roller unit 42G.

Figure 9:
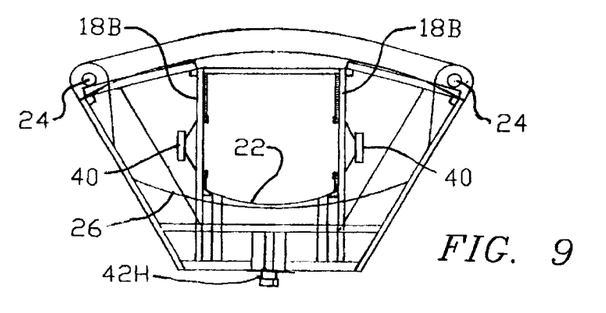
FIG. 9 is a bottom cross-sectional view of the module taken through axis 9–9' of FIG. 6, showing the location of two speakers.

FIG. 9 is a cross-sectional view of the module 18 looking upwardly at axis 9–9' of FIG. 6, showing the two speakers 40 mounted on side baffle panels 18B, also showing the locations of the handles 24 and stabilizing roller unit 42H, and showing shroud 22 and liner panel 26 which are each bent to the curved shapes shown at installation and are held in place by a snap-in arrangement for easy installation and removal.

Figure 10:
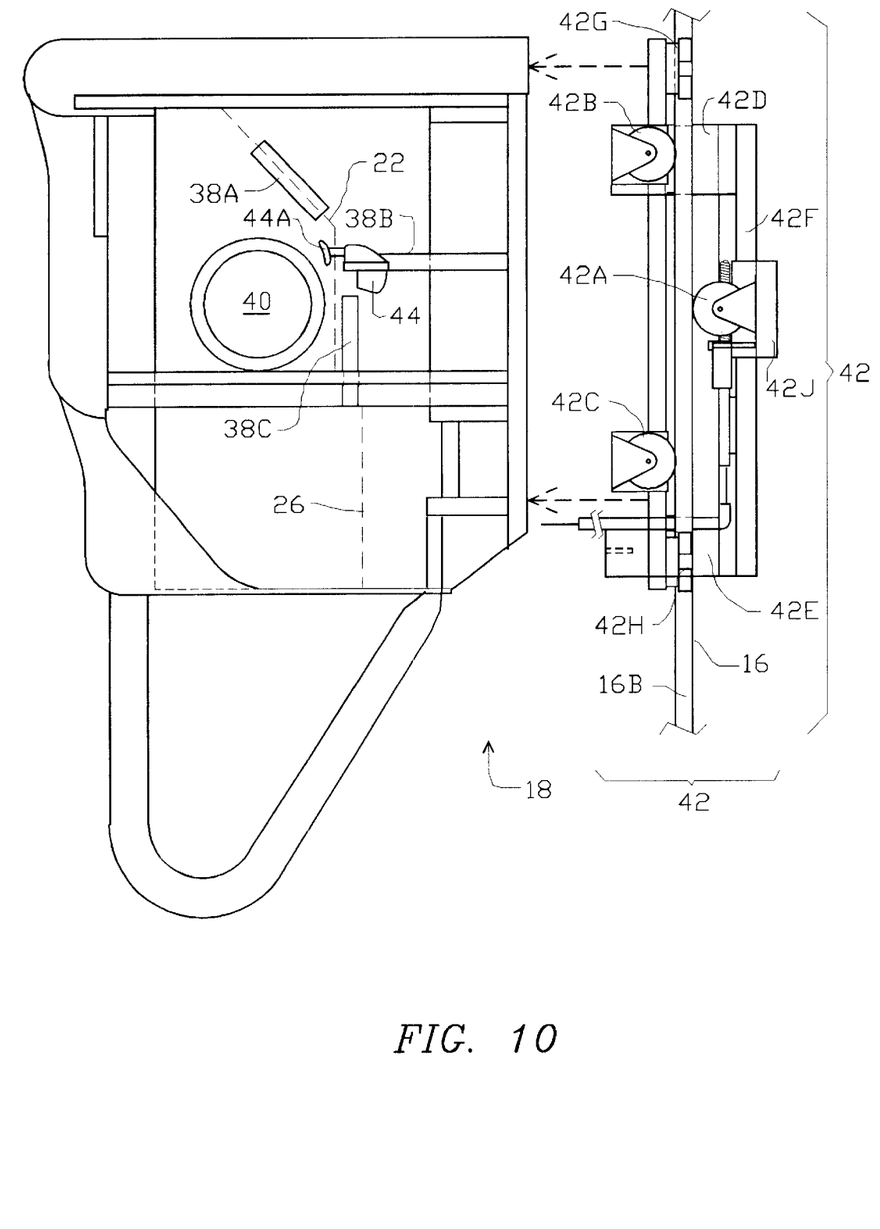
FIG. 10 is an enlargement of FIG. 7, with the addition of a roller assembly that provides vertical travel and includes a braking mechanism that secures the module in place for viewing.

FIG. 10 is an enlargement of the cutaway side view of module 18 of FIG. 7, with the addition of roller assembly and braking mechanism 42 having a pair of rollers 42A bearing against the inside surface of the vertical wall of tower portion 16 and two pairs of rollers secured to module 18: 42B at the top and 42C at the bottom, bearing against the outside surface of the vertical wall of tower portion 16. The internal portion of roller assembly 42 (carrying rollers 42A inside tower 16) is attached to the external portion (carrying rollers 42B and 42C outside tower 16) via struts 42D and 42E which are attached to the top and bottom respectively of a vertical member 42F and which extend through the vertical central slot (16A: refer to FIG. 1) of the tower portion 16 to the exterior where they are attached the exterior portion of the roller assembly/braking mechanism 42. In this exterior portion, the stabilizing roller units, 42G at the top and 42H in a lower location, each have two small rollers arranged on a small plate that is adjusted to cause the rollers to bear against the pair of metal angles 16B that form opposite walls of the vertical central slot (16A: refer to FIG. 1) of the tower portion 16 for the purpose of stabilizing the module 18 against skewing or yawing as it travels up or down.

Sloping members 38A, horizontal members 38B and vertical members 38C, attached to the enclosure of module 18, serve to support shroud 22 in place as indicated. Shroud 22 and liner panel 26 are indicated by dashed lines representing central cross-sections of these curved items (refer to FIG. 9). LCD stereoscopic viewing unit 44, attached to the rear of shroud 22, includes an electronic stereoscopic field-sequential video demultiplexer, and is configured with forehead guidepiece 44A which extends through shroud 22 to act a positioning guide for viewing. The LCD stereoscopic viewing unit 44 is commercially available complete with the demultiplexer, e.g. from I/O Display Systems, Menlo Park, Calif.

The entire interior of each module 18 is lined with an acoustic damping material that provides excellent sound isolation between the interior and the external environment. Also the interior is finished in black or other dark color to absorb ambient light.

Figure 11:
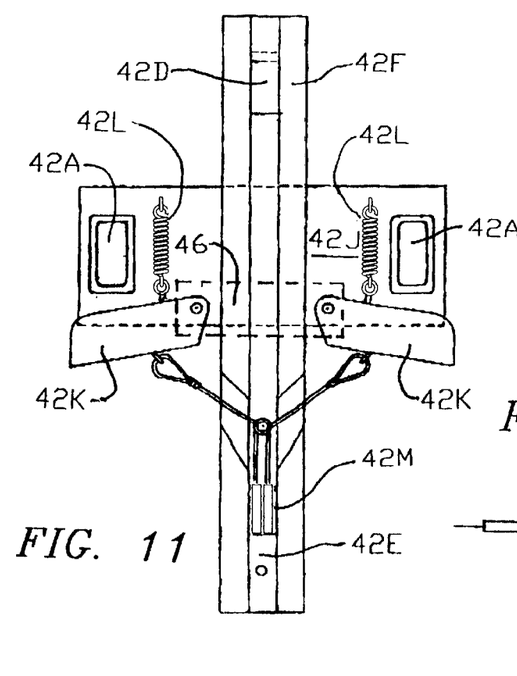
FIG. 11 is elevational view of the roller assembly/braking mechanism of FIG. 10 as seen from inside the main tower portion.

FIG. 11 is an elevational view of the inner portion of the constraining assembly/braking mechanism 42, i.e. the portion that is located inside the tower portion 16, as viewed from inside. Vertical member 42F, having two strips flanking and attached to top and bottom struts 42D and 42E, is also attached to cross-member 42J which carries the pair of rollers 42A and a pair of pivoted brake cams 42K that are spring-loaded by coil springs 42L. An optional cross-member 46, shown in dashed lines, may be provided and fastened to vertical member 42F for purposes of additional strength reinforcement of the pivots indicated near the ends of cross-member 46. Brake cams 42K are lined with neoprene at their braking surface regions to provide grip as they engage vertical ribs built into tower portion 16.

A brake cable assembly 42M, attached to the lower sides of brake cams 42K, is fed through the slot (16A: refer to FIG. 1) to the brake release lever (36: refer to FIG. 6) which in the illustrative embodiment is arranged so that grasping either lever 36 will release both brake cams 42K simultaneously, so that the user can release the module 18 with either the right or left hand, thus providing single-handed release for right or left handed users. Using both hands reduces the required force for each hand to half of that required when only one lever is used.

Figure 12:
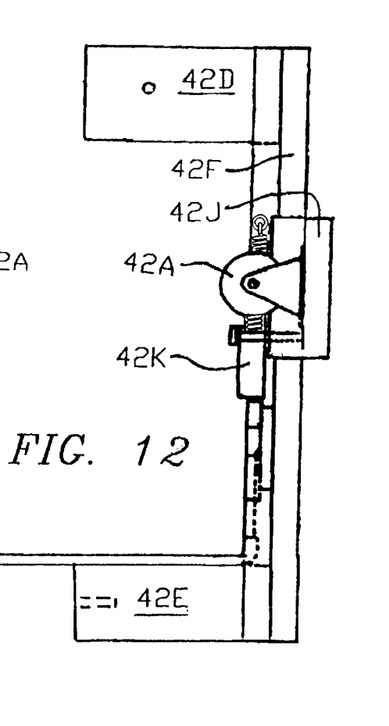
FIG. 12 is a side elevational view of the roller assembly/braking mechanism of FIG. 11.

FIG. 12 is a side elevational view of the inner portion of roller assembly/braking mechanism 42 of FIG. 11 showing the location of rollers 42A on cross-member 42J, struts 42D and 42E extending from vertical member 42F, and brake cams 42K.

Figure 13:
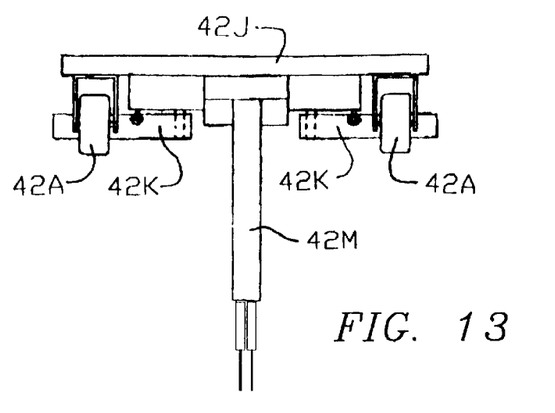
FIG. 13 is a top view of the roller assembly/braking mechanism of FIG. 11.

Similarly FIG. 13 is a top view of the inner portion of the roller assembly/braking mechanism 42 of FIG. 11, showing the location of rollers 42A, brake cams 42K and brake release cable assembly 42M on cross-member 42J.

Referring once again to FIG. 1, the various component parts of the station 10, FIG. 1, i.e. baseplate 12, pedestal 14, tower portion 16, the six modules 18 and the crown portion 20, are all made so that they can be readily transported separately and assembled together on-site, and then on later occasions repeatedly disassembled, transported and re-assembled at a different location. For this reason there is an option regarding attachment of the outer portion of the roller assembly/braking mechanism (42: FIG. 10): the outer portion components may be attached directly to the corresponding module 18 as indicated, or they may be attached to a flat interface panel, which includes rollers 42B and 42C, and to which module 18 is attached in a manner that it can be easily detached to facilitate repeated assembly and disassembly of the station.

As alternatives to the preferred embodiment described above, there are options such as powering the elevation adjustment in an alternative manner such as electrically, hydraulically or pneumatically instead of the manual method shown.

As an alternative to making the entire module adjustable vertically as described above, the module enclosure could be fixed in place on the main central column, with only a smaller assembly including the eyepieces made vertically adjustable. Furthermore, this would allow the option of making each module a complete enclosure, even including a door, in the manner of a telephone booth, that could even further enhance isolation sound-proofing and ambient light control.

Instead of the quantity of six modules as shown, the station could be designed to have any other desired number of modules, or even a single module, and these could be arranged other than in the radial array shown: e.g. in-line or in an oval, semi-circle, square or rectangular station multiple layout The structure shown is equally adaptable to viewing in various formats e.g. color or monochrome, 3D or regular 2D, and in any of various video formats in use worldwide. The sound can be mono, stereo or multi-channel surround, and thus any desired number of speakers can be provided in each module.

All of the modules can be fed from a common program source which can be made to run continuously or else start on user demand; alternatively there can be a selection of sources provided in each module.

Headphones could be utilized instead of speakers or as a user option to reduce sound or noise interference. The interior of the module may be treated with sound absorbing material and/or made dark to enhance viewing.

As an alternative to the unilateral braking system described, the braking may be made bilateral, i.e. to positively lock the module in place as the default condition, requiring a control actuation by the user to either raise or lower the module.

This invention may be embodied and practiced in other specific forms without departing from the spirit and essential characteristics thereof. The present embodiments therefore are considered in all respects as illustrative and not restrictive. The scope of the invention is indicated by the appended claims rather than by the foregoing description. All variations, substitutions, and changes that come within the meaning and range of equivalency of the claims therefore are intended to be embraced therein.

What is claimed is:

1. A viewing and listening station comprising:
    a stationary vertical structural member extending upwardly from a floor level to an overhead level;
    at least one video viewing device; and
    an attachment system made and arranged to (1) couple each said video viewing device independently to said vertical structural member, interfaced at a constant close proximity thereto, (2) hold said viewing device constrained at all times against rotation on any axis and against movement in any horizontal direction, and (3) provide (a) a default stationary condition, automatically deployed when unattended and during viewing, wherein said viewing device is further constrained against vertical movement and is thus held stationary, constrained against rotation on any axis and movement in any direction, and (b) an elevation adjustment condition wherein a user is enabled to over-ride the default stationary condition and adjust elevation of said video viewing device in a linear path in a designated vertical direction, for optimal viewing in an adjustment range that accommodates height variations of users including adults and children.

2. The viewing and listening station as defined in claim 1 wherein, for each said video viewing device, said attachment system comprises;
    a guidance mechanism made and arranged to attach said video viewing device to said stationary vertical structural member in a manner that at all times allows said video viewing device to move only in the designated vertical direction, constrained against movement in any other direction and against rotation on any axis;
    a vertical constraint mechanism made and arranged to implement the default stationary condition by further constraining said video viewing device and associated components against vertical movement, and thus, in cooperation with said guidance mechanism, holding said video viewing device stationary while in the default stationary condition, and
    a manual release mechanism made and arranged to enable the user to over-ride the default stationary condition and invoke the elevation adjustment condition by releasing said video viewing device from vertical constraint, thus allowing elevation adjustment of said video viewing device.

3. The viewing and listening station as defined in claim 2 further comprising:
    at least one module containing a corresponding unit of said viewing device; and
    a counter-balancing mechanism, operationally connected to a corresponding unit of said module, made and arranged to substantially counter-balance said module containing said viewing device and thus facilitate module elevation adjustment.

4. The viewing and listening station as defined in claim 3, wherein:
    said vertical structural member is configured as a hollow column; and
    said viewing and listening station comprises a plurality of said modules arranged around the column.

5. The viewing and listening station as defined in claim 4 wherein said vertical constraint mechanism further comprises;
    at least one handle attached to each said module made and arranged to facilitate raising and lowering said module
    a braking mechanism associated with each module, made and arranged to apply a default braking action that secures said module to said column so as to maintain a selected elevation level; and
    at least one brake-release control member, made and arranged to enable the user, through actuation thereof, to defeat the default braking action and adjust module elevation.

6. The viewing and listening station as defined in claim 5 wherein said brake-release control member is implemented as a user hand-operated lever, located on said handle.

7. The viewing and listening station as defined in claim 5 wherein said braking mechanism comprises:
    a plurality of vertical braking surfaces, two for each module, disposed within the column and structurally integrated therein;
    a pair of brake shoes, pivotedly attached to said attachment system engaging a corresponding pair of vertical braking surfaces in cam-like action under a biasing force, made and arranged to automatically apply default braking action in a positively reinforced manner in response to said module tending to move downwardly, but to allow easy upward movement of said module by a user; and
    brake linkage connecting said brake-release control member to said pair of brake shoes in an operational manner that enables the user to defeat the default braking action for module elevation adjustment by actuating said brake-release control member.

8. The viewing and listening station as defined in claim 3, wherein said counter-balancing mechanism comprises, in each association of with said modules:
    a counter-weight, approximately equaling said module in weight, disposed inside the column in a location that allows travel in a vertical direction; and reciprocal linkage engaging said module and said counter-weight in a counter-balanced relationship such that said counter-weight is caused to travel equally and oppositely relative to said module in the vertical direction within the predetermined travel range.

9. The viewing and listening station as defined in claim 8 wherein said reciprocal linkage comprises;
  a horizontal support member secured to a top region of the column;
  pulley means, supported by said horizontal support member, disposed above the column and above said module;
  a flexible suspension cable attached at opposite ends effectively to said module and to said counter-weight, directed over said pulley means so as to counterbalance said module versus said counter-weight.

10. The viewing and listening station as defined in claim 3 wherein each said module is configured with a pair of side members extending from a rear region thereof, providing a front opening to accommodate the user.

11. The viewing and listening station as defined in claim 10 further comprising transducer means for sound reproduction including a pair of stereo loudspeakers disposed one on each side member of said module.

12. The viewing and listening station as defined in claim 1 wherein said video viewing device comprises an electronic stereoscopic video viewing unit with binocular eyepieces and associated optics.

13. The viewing and listening station as defined in claim 1 wherein said vertical structural member is configured as a hollow column made to have at least a major upper portion that is configured with a generally semicircular cross-sectional shape defining a semi-polygon with a diametric rear side and a plurality of substantially identical flat facets, and wherein are provided a plurality of modules, each captivated to the column, interfacing a corresponding facet, said walk-up viewing and listening station being made and arranged to have a generally flat shape at the diametric rear side, suitable for positioning against a vertical wall.

14. A viewing and listening station comprising:
  a stationary column extending vertically from a floor level to an overhead level;
  a plurality of modules attached to said column in a manner to allow each module to travel independently in a predetermined linear vertical direction within a predetermined travel range, said module having a rear portion interfacing said column and having an opening to accommodate a user;
  a visual display, for viewing of visual program material by the user, incorporated in each module at a suitable viewing location; and
  transducer means for sound reproduction, incorporated in each module, made and arranged to enable an individual user to listen to audio program material;
  said column being made to have at least a major upper portion that is hollow and that has a polygonal cross-sectional shape defining a plurality of flat facets, each interfacing a corresponding one of said modules; and
  each said module being configured with a hooded shape having an opening facing outwardly and downwardly so as to accommodate an upper body portion of a user, and with a rear portion made substantially flat and disposed substantially parallel to the corresponding one of the facets of said column.

15. The viewing and listening station as defined in claim 14 wherein each of the facets on said column is configured with at least one vertical slot extending through the facet from an outward surface thereof to an inward surface thereof, and wherein each of said modules is captivated to said column in a vertically moveable manner by a two-portion roller assembly comprising:
  a first portion disposed within said column having a pair of rollers disposed side-by-side approximately midway between top and bottom extents of said module, including at least one strut extending through the vertical slot in said column facet; and
  a second portion disposed outside said column and effectively affixed to a rear region of said module, having two pairs of side-by-side rollers of which a first pair is disposed on an upper portion of the rear region of said module and the second pair is disposed on lower portion of the rear region of said module, said second portion being secured to said first portion by the strut extending through the vertical slot in said column facet, so that the four rollers of said module bear against the outward side of said column facet, while the two rollers within said column bear against the inward surface of said column facet, thus captivating said module and constraining against rotation and movement thereof in a horizontal radial direction while allowing vertical movement of said module within the travel range, guided and supported by the rollers.

16. The viewing and listening station as defined in claim 15 further comprising, in each association of said modules, side-constraint means for substantially constraining said module against skewing, yawing and other extraneous sideways horizontal movement.

17. The viewing and listening station as defined in claim 16 wherein said side constraint hyphem means comprises:
  a first pair of guide rollers located on a central upper rear region of said module, and a second pair of guide rollers located in a central lower rear region of said module, said guide rollers being made and arranged to rollon opposite surfaces of the central vertical slot in the corresponding facet of said column.

18. The viewing and listening station as defined in claim 14 comprising six modules, the column having a hexagonally shaped cross-section.

19. The viewing and listening station as defined in claim 14 further comprising a circular base plate, attached to the column at a lower end thereof at the floor level, and extending horizontally from the column.

20. The viewing and listening station as defined in claim 5 wherein each module comprises a pair of side panels extending outwardly, one from each opposite edge of the rear portion.

21. The viewing and listening station as defined in claim 20 further comprising transducer means for sound reproduction, incorporated in each module, made and arranged to enable an individual user to listen to audio program material.

22. The viewing and listening station as defined in claim 20 further comprising means for user selection and control of viewing and listening program material.

23. A viewing and listening station comprising:
  a vertical column extending upwardly from a floor level to an overhead level, made to have a major upper portion that is hollow and that has a polygonal cross-sectional shape defining a plurality of flat facets;
  a plurality of modules, each captivated to a corresponding facet of said column in a manner to allow said module to travel vertically within a predetermined travel range, said module having a rear portion interfacing said column and having a hooded shape with an opening facing outwardly and downwardly so as to accommodate an upper body portion of a user standing in an operational location, the travel range being made sufficient to accommodate adults and children;

a video display for viewing of video program material by the user, incorporated in each module at a location suited to viewing by the user;

transducer means for sound reproduction incorporated in each module, made and arranged to enable an individual user to listen to audio program material;

a counter-balancing mechanism associated with each module, made and arranged to substantially counter-balance each of said modules within the travel range, and to thus enable the user to easily raise and lower said module as required to set the elevation;

a braking mechanism associated with each module, made and arranged to apply a default braking action that secures said module to said column so as to maintain the elevation as set; and at least one user-operable brake-release control member, made and arranged to enable the user to defeat the default braking action in order to adjust module elevation.

24. The viewing and listening station as defined in claim 23 further comprising:

a base plate attached to said column at a lower end thereof at the floor level, and extending horizontally from said column.

25. A method of assembling a viewing station based on a stationary column having a wall with front and rear surfaces and carrying at the front surface at least one module, containing a video viewing device, the method comprising:

configuring the wall of the column with at least one vertical slot;

configuring the module to interface with the front surface of the wall in a manner to allow vertical travel;

locating the module against the wall in symmetric relationship with the vertical slot;

providing a rear retaining assembly made and arranged to interface with the rear surface of the wall in a manner to allow vertical travel;

attaching the rear retaining assembly to the module via at least one strut member extending through the slot; and providing guidance mechanism made and arranged to cooperate with the rear retaining assembly in a manner to constrain the module against rotation on any axis and against movement in any direction other than a designated vertical direction.

26. The method of assembling a viewing station as defined in claim 25 further comprising:

providing a default braking mechanism made and arranged to (a) apply vertical constraint such that, in cooperation with the guidance mechanism, the module and the video viewing device are thusly held stationary during viewing and when unattended, and (b) allow the user to release the vertical constraint so that the module can be moved vertically for adjusting module elevation.

27. The method of assembling a viewing station as defined in claim 26 further comprising:

providing for each module a counter-balancing system to substantially cancel gravitational force on the module and thus facilitate adjustment of module elevation.

* * * * *